United States Patent
Chi et al.

(10) Patent No.: US 9,092,491 B2
(45) Date of Patent: Jul. 28, 2015

(54) SEARCHING DOCUMENTATION ACROSS INTERCONNECTED NODES IN A DISTRIBUTED NETWORK

(75) Inventors: Lucas Yi Chi, Cortlandt Manor, NY (US); Bryan Parker, Chicago, IL (US); Xi Sean Xu, Lake Hiawatha, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/179,861

(22) Filed: Jul. 11, 2011

(65) Prior Publication Data
US 2013/0018868 A1    Jan. 17, 2013

(51) Int. Cl.
G06F 7/00      (2006.01)
G06F 17/30    (2006.01)

(52) U.S. Cl.
CPC ............................. *G06F 17/30545* (2013.01)

(58) Field of Classification Search
CPC ................. G06F 17/30867; G06F 17/30545
USPC ............................................ 707/722, 999.001
See application file for complete search history.

(56) References Cited

U.S. PATENT DOCUMENTS

| | | | |
|---|---|---|---|
| 6,601,075 B1* | 7/2003 | Huang et al. .................. 707/748 |
| 7,606,809 B2* | 10/2009 | Soroca .................................. 1/1 |
| 7,664,833 B2* | 2/2010 | Shoolman et al. ............ 709/219 |
| 7,698,442 B1* | 4/2010 | Krishnamurthy et al. .... 709/229 |
| 7,725,470 B2 | 5/2010 | Richards et al. |
| 7,729,295 B2* | 6/2010 | Hibino et al. ................. 370/256 |
| 7,849,142 B2* | 12/2010 | Clegg et al. .................... 709/206 |
| 7,877,385 B2 | 1/2011 | Craswell et al. |
| 8,255,975 B2* | 8/2012 | Li et al. ............................ 726/3 |
| 8,352,467 B1* | 1/2013 | Guha ............................ 707/727 |
| 8,370,902 B2* | 2/2013 | Davis et al. ...................... 726/3 |
| 8,462,665 B2* | 6/2013 | Tabbara et al. ............... 370/254 |
| 8,533,280 B1* | 9/2013 | Clarke et al. ................... 709/207 |
| 8,548,918 B1* | 10/2013 | Amidon et al. .................. 705/51 |
| 2002/0147845 A1* | 10/2002 | Sanchez-Herrero et al. . 709/245 |
| 2003/0158745 A1* | 8/2003 | Katz et al. ......................... 705/1 |
| 2004/0049510 A1* | 3/2004 | Minch et al. .................. 707/100 |
| 2005/0197846 A1* | 9/2005 | Pezaris et al. ..................... 705/1 |
| 2006/0042483 A1* | 3/2006 | Work et al. ...................... 101/91 |
| 2006/0109839 A1* | 5/2006 | Hino et al. ..................... 370/352 |
| 2006/0149708 A1* | 7/2006 | Lavine ............................. 707/3 |
| 2007/0088826 A1* | 4/2007 | Raphel et al. ................. 709/225 |
| 2008/0043774 A1* | 2/2008 | Achtermann et al. ........ 370/464 |

(Continued)

OTHER PUBLICATIONS

Zhu et al.; "High Search Performance, Small Document Index: P2P Search Can Have Both", HiPC International Conference on, Dec. 16-19, 2009, pp. 312-321.

(Continued)

*Primary Examiner* — Miranda Le
(74) *Attorney, Agent, or Firm* — Joe Polimeni; SVL IPLaw Edell, Shapiro & Finnan, LLC (57) ABSTRACT

Documentation from a network including a plurality of computing nodes is achieved by processing a query for documentation at one or more of the computing nodes within the network in accordance with a priority of each of the computing nodes to obtain search results pertaining to the documentation, where the priority for each computing node is based on a quantity of incoming connections for each computing node. The search results are prioritized in accordance with the priority of the corresponding one or more computing nodes providing the search results.

17 Claims, 4 Drawing Sheets

(56) References Cited

U.S. PATENT DOCUMENTS

| | | | |
|---|---|---|---|
| 2008/0082662 A1* | 4/2008 | Dandliker et al. | 709/225 |
| 2009/0037412 A1* | 2/2009 | Bard et al. | 707/5 |
| 2009/0168795 A1* | 7/2009 | Segel | 370/429 |
| 2009/0182842 A1 | 7/2009 | Dutta et al. | |
| 2009/0216790 A1 | 8/2009 | Dexter | |
| 2009/0320097 A1 | 12/2009 | Jackson et al. | |
| 2010/0010826 A1* | 1/2010 | Rosenthal et al. | 705/1 |
| 2010/0154054 A1* | 6/2010 | Beck | 726/21 |
| 2010/0161145 A1* | 6/2010 | Baeza-Yates et al. | 700/291 |
| 2010/0185683 A1 | 7/2010 | Baby et al. | |
| 2010/0205172 A1 | 8/2010 | Luk | |
| 2010/0262706 A1* | 10/2010 | Rodriguez et al. | 709/229 |
| 2010/0281022 A1 | 11/2010 | Gollapudi et al. | |
| 2010/0312861 A1* | 12/2010 | Kolhi et al. | 709/219 |
| 2011/0016353 A1 | 1/2011 | Mikesell et al. | |
| 2011/0066629 A1 | 3/2011 | Escalante et al. | |
| 2011/0072508 A1* | 3/2011 | Agarwal et al. | 726/13 |
| 2011/0078765 A1* | 3/2011 | Roskind | 726/3 |
| 2011/0093615 A1* | 4/2011 | Novo Diaz et al. | 709/238 |
| 2011/0138467 A1* | 6/2011 | Macwan et al. | 726/24 |
| 2011/0191832 A1* | 8/2011 | Davis et al. | 726/5 |
| 2011/0265148 A1* | 10/2011 | Tam et al. | 726/4 |
| 2012/0110191 A1* | 5/2012 | Johansson | 709/227 |
| 2012/0144038 A1* | 6/2012 | Hildebrand | 709/226 |

OTHER PUBLICATIONS

Zeinalipour-Yazti et al.; "pFusion: A P2P Architecture for Internet-Scale Content-Based Search and Retrieval", IEEE Transactions on, vol. 18, Iss. 6, Jun. 2007, pp. 804-817.

* cited by examiner

SEARCHING DOCUMENTATION ACROSS INTERCONNECTED NODES IN A DISTRIBUTED NETWORK

BACKGROUND

1. Technical Field

Embodiments of the invention relate to searching documentation using a distributed network.

2. Discussion of the Related Art

Current systems for searching and sharing documentation are based upon a client/server relationship in which a central server provides a unified point of access for clients to search, share and view relevant documentation. However, this relationship can result in a single point of failure (e.g., the server, at which information may be collected and shared, and/or any particular node which provides a source of documentation has a performance or failure issue).

BRIEF SUMMARY

In accordance with example embodiments of the invention, a computer-implemented method, system and computer program product are provided for retrieving documentation from a network including a plurality of computing nodes. A query is processed for documentation at one or more of the computing nodes within the network in accordance with a priority of each of the computing nodes to obtain search results pertaining to the documentation, where the priority for each computing node is based on a quantity of incoming connections for each computing node. Search results are arranged in accordance with the priority of the corresponding one or more computing nodes providing the search results.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Present invention embodiments provide for retrieving documentation from a distributed network including a plurality of computing nodes, where a query for documentation is processed at one or more computing nodes within the network in accordance with a priority or trust factor associated with each of the computing nodes. Search results are obtained pertaining to the documentation, where the search results are based upon the trust factor or priority for each computing node. The priority is determined based upon a quantity of incoming connections for each computing node. The search results are then arranged according to the determined priority of the computing nodes that have and can provide some or all of the documentation from the query.

Figure 1:
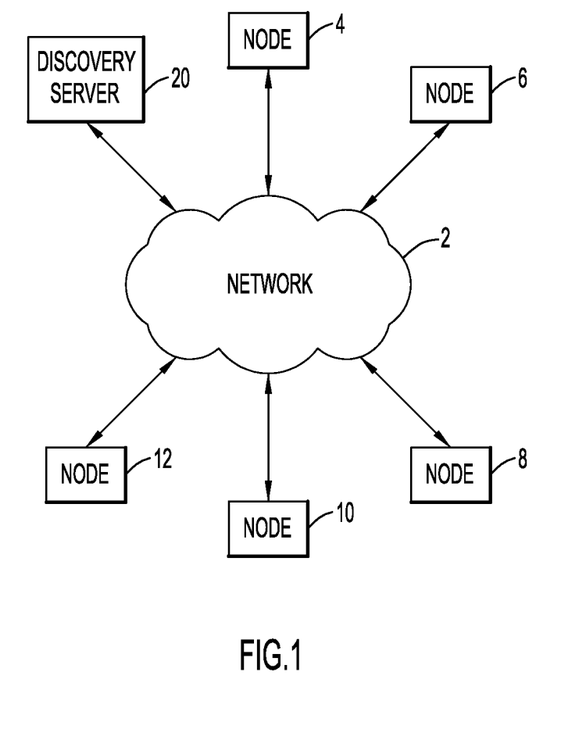
FIG. 1 is a diagrammatic illustration of an example embodiment of a distributed network system in accordance with the present invention.

An example embodiment of a system that implements features of the present invention is depicted in FIG. 1. The system includes a network 2 that facilitates communication between a plurality of computing nodes 4, 6, 8, 10, 12. While only five computing nodes are shown in FIG. 1, it is to be understood that a system network can include any selected number of computing nodes (e.g., hundreds, thousands or even more computing nodes) that are in communication over the network 2. The system also includes a discovery server 20 that maintains a registry containing information of all of the nodes (e.g., location, information about the node, including types of information the node contains, etc.) that are connected to each other within the network 2. The discovery server 20 can further be configured to process queries submitted by a particular computing node to determine which node or nodes should be accessed to provide documentation requested by the query. In addition, the discovery server 20 is configured to crawl the network to continuously confirm, establish and/or discover computing nodes (as well as confirm or regenerate, as necessary, metadata and content associated with each node of the network).

Each of the discovery server 20 and nodes 4, 6, 8, 10, 12 can be remote from each other and communicate with each other via the network 2 as indicated by the arrows shown in FIG. 1. While each computing node 4, 6, 8, 10, 12 is configured to communicate with the discovery server 20, it is noted that not every node may be capable of communicating with every other node in the network 2 (e.g., some nodes may only be able to communicate with certain other nodes in the network). The ability for each computing node to communicate with another computing node is based upon a trust factor that is determined by the discovery server 20 in a manner such as described in further detail below. The network 2 is configured with suitable communications media to facilitate transfer of any types of data and/or other information between two or more computing nodes, and between the discovery server 20 and any of the computing nodes in the network. Communications over the network can be achieved utilizing any suitable communications media (e.g., wide area network (WAN), local area network (LAN), Internet, Intranet, etc.). Alternatively, any one or more nodes and/or the discovery server 20 may be local to each other, and communicate via any appropriate local communication medium (e.g., local area network (LAN), hardwire, wireless link, Intranet, etc.).

Each of the computing nodes 4, 6, 8, 10, 12, discovery server 20 and communications media associated with the network 2 may be implemented by any conventional or other computer systems which can be equipped with a display or monitor to provide a graphical user or other interface (e.g., to provide command line prompts, menu screens, etc.) to solicit documentation queries and/or other information from users, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis and/or other types of modules, browser/interface software, etc.).

Figure 2:
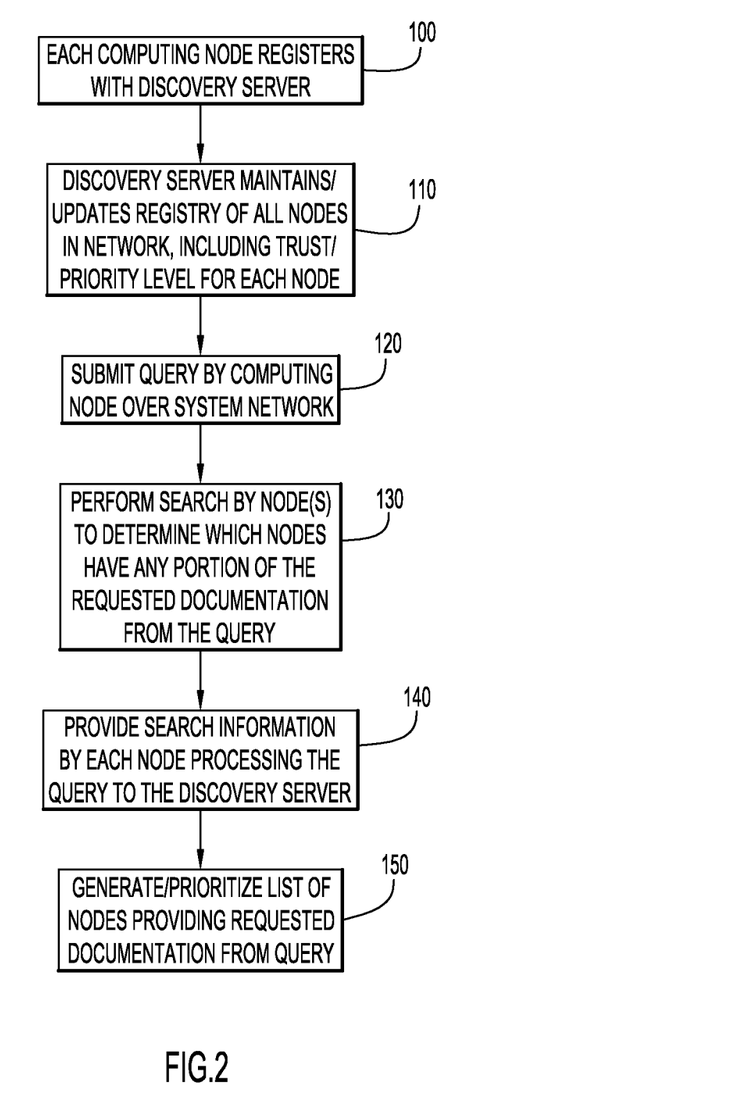
FIG. 2 is a flow diagram illustrating searching and obtaining documentation across interconnected nodes in a distributed network according to an embodiment of the present invention.

Operation of the distributed network depicted in FIG. 1 is now described with reference to the flowchart of FIG. 2. Initially, any time a new computing node becomes connected within the system network 2, the new computing node registers with the discovery server 20 (step 100). The discovery server 20 maintains a registry of all of the nodes in the system network 2 (e.g., of nodes 4, 6, 8, 10 and 12), and updates the registry as necessary (step 110). For example, the registry can be updated when any new computing node joins the system network 2. As noted above, the registry includes information about each computing node including, as non-limiting examples, node location, types of documentation information that might be at each node, relationships or connections between each node and other nodes, node operator for each node, current loads at one or more nodes, accessibility information associated with each node, etc. The registry of the discovery server also provides a recognition of each node to the other nodes forming the system network 2, which makes it easier for one node to discover and form a connection with another node. As part of the maintaining/updating of the registry, the discovery server 20 establishes and maintains a trust level or priority level for each computing node within the network. This trust/priority level can be modified by the discovery server 20 based upon the addition of new nodes within the network, changing relationships for each node with respect to other nodes, etc.

Figure 3:
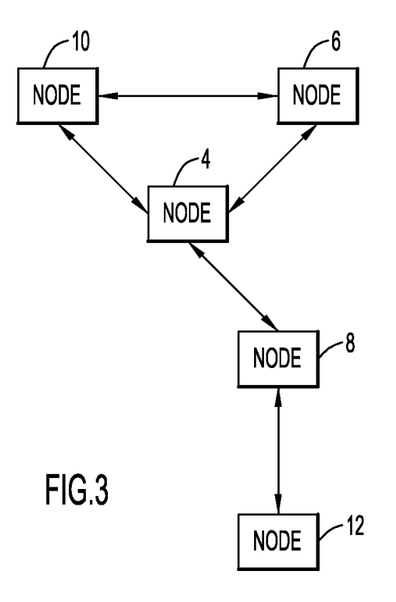
FIG. 3 provides an example showing connections between computing nodes for the system of FIG. 1 according to an embodiment of the present invention.
Figure 4:
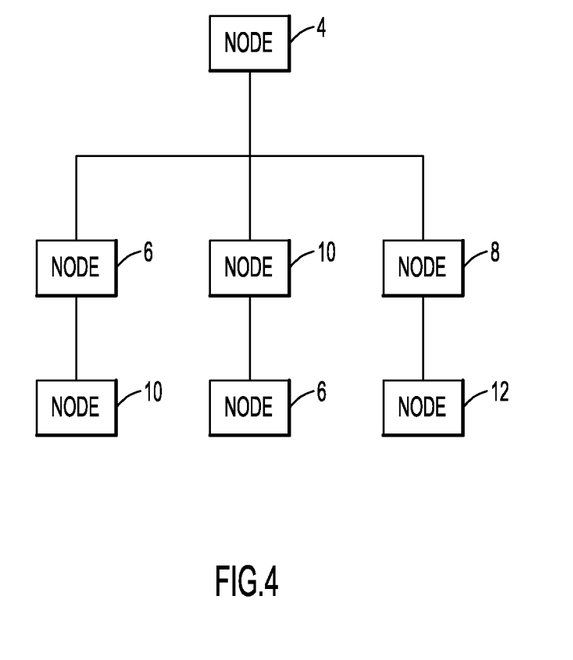
FIG. 4 provides a hierarchical order of computing nodes based upon the connections between nodes as shown in FIG. 3 according to an embodiment of the present invention.

In an example embodiment, the trust or priority level assigned to each computing node within the network 2 is derived by the discovery server 20 based upon a number of incoming connections associated with each node. For example, one computing node may have 100 connections with other nodes, while another node may have 50 or less connections with other nodes. The computing node with 100 connections would be assigned a higher trust or priority value in relation to the other node fewer connections (50 connections or less). In addition, connections between nodes can be based upon the trust level for each node. For example, well established nodes having a selected number of connections with other nodes will have a suitably high threshold that permits such nodes to establish direct or indirect connections with other nodes, while relatively newer nodes or nodes having a lower number of connections with other nodes and thus a lower trust level will may not be allowed to establish connections with other nodes (e.g., nodes having much higher trust levels). The discovery server 20 can be configured to act as the arbiter to determine when any computing node may establish a connection with another computing node. An example embodiment showing connections between each of the nodes 4, 6, 8, 10 and 12 is shown in FIG. 3. As can be seen from the depiction in FIG. 3, computing node 4 has the most direct connections (4) between the other nodes shown, while nodes 6, 8 and 10 have the second most direct connections (3), and node 12 (e.g., a newer node recently joining the network 2) has the fewest number of direct connections (1). In this scenario, assuming there are only the five nodes 4, 6, 8, 10, 12, the priority or trust value for the nodes would be set (from greatest to least trust value) in the following order: node 4, nodes 6, 8 and 10 (having the same or similar trust value), and node 12. In addition, the nodes can be represented in a hierarchical tree, as shown in FIG. 4, to show both the direct and indirect connections between nodes. For example, node 4 (which may be a root node for this connection of nodes) has the most direct and indirect connections (with indirect connections to node 12 through node 8, node 10 through node 6, and node 6 through node 10).

As noted above, the number of nodes shown in the figures is simplified, and it is noted that the network system 2 can include any number of nodes (e.g., hundreds or even thousands or more nodes) all having interconnections and resultant trust or priority rankings based upon such direct connections and/or including more hierarchical indirect connections.

Each computing node within the system network 2 can both provide and consume or accumulate documentation. For example, a first computing node (e.g., node 4) having a higher trust level than a second computing node (e.g., node 6) may obtain documents from the second computing node with which the first computing node has an established direct connection, where such documents are not already located at the first computing node. The first computing node (e.g., node 6) can also obtain documents from a third computing node through which the first computing node has an indirect connection (e.g., node 12) by communication with one or more nodes connecting the first and third nodes (e.g., node 8). The first computing node may also be configured to share documents at the first computing node with the second and/or third computing node (i.e., sharing with direct and/or indirect computing nodes. Providing nodes that are capable of communicating, downloading and/or sharing documentation or other information between nodes facilitates a redundancy in stored documentation at a variety of separate computing nodes over the network 2, which in turn reduces the chances or likelihood of a scenario in which there might be a single point of failure with respect to obtaining documentation requested by a computing node (e.g., if such documentation is located only at a single node or a relatively small number of nodes having operational issues such that these nodes are not capable of providing the requested documentation).

Referring again to FIG. 2, a user at a computing node submits a query over the system network 2 (step 120). The query may be initially processed by the discovery server 20 to determine the documentation that is requested for the query, and then assign one or more nodes to analyze and retrieve documentation requested from the query. Alternatively, the query may be initially processed by one of the computing nodes to which the node submitting the query is directly or indirectly connected. The determination regarding which computing node or nodes might initially be assigned to process the query can be based upon any suitable method. In an example embodiment, the computing node or nodes that previously provided requested documentation (or information relating to requested documentation) to a node based upon a previous query may be initially assigned the task of processing the query to obtain the requested documentation. In another example embodiment, the node or nodes having the greatest trust level (as determined via the registry at the discovery server 20) may be initially assigned the task of processing the query to obtain the requested documentation or information associated with the requested documentation. In a further example embodiment, the node or nodes that are determined to have the fastest or most rapid response time for providing information (based upon historical information known, e.g., by the discovery server in relation to typical or average response times of one or more nodes) can be assigned the initial task of processing a query. Any combination of these example embodiments can also be implemented to determine which node or nodes to assign the initial task of processing the query (e.g., nodes having the fastest response times and the highest trust levels can have priority for processing queries in relation to all other nodes in the network).

Next, a search is performed by one or more nodes to determine which nodes have any portion of the requested documentation or information associated with the requested documentation (step 130). Each node that is initially assigned the task of processing the query searches for documentation requested from the query by first determining whether the processing node has the documentation or information associated with the requested documentation. If a processing node does not have some or all of the requested documentation or information associated with the requested documentation, the search continues to nodes adjacent (i.e., directly connected with) the processing nodes. When it is determined that a particular processing node includes some or all of the requested documentation or information associated with such requested documentation, any node satisfying some or a portion of the query provides information to the discovery server 20 relating to what information/documentation that node contains that is relevant to the query (step 140). A determination can be made, for example, by the discovery server 20, to stop searching for documentation or information associated with the requested documentation from a query based upon the information uncovered during the search. For example, if it is determined that a suitable number of computing nodes having an appropriate trust factor can provide all of the requested documentation or a suitable amount of information associated with the requested documentation from the query, the search can be stopped at this point.

The discovery server 20 generates and prioritizes a list of search results identifying which nodes contain a portion or all of the requested documentation or information relating to such requested documentation (step 150). The list of search results prioritizes nodes based upon relevance of information to be provided by each node in relation to the query and also the trust level associated for each node identified as having some amount of information relevant to the query. Thus, computing nodes having the most connections (direct and/or indirect) with other nodes and also a sufficient relevancy factor (as determined by the type of information a node can provide in relation to the query) will be ranked higher in the list of search results in relation to other nodes with lower trust levels and/or lower relevancy factors. For example, for two nodes that provide identical relevant information relating to a query, the node having the greater trust factor will be ranked higher in the list of search results in relation to the other node having a lower trust factor. The higher trust factor assigned to a particular node (based upon number of connections with other nodes) in essence provides an indication that this node has a higher probability of serving as a reliable content source in relation to other nodes having a lower trust factor.

The search results can be provided by the discovery server 20 to the computing node that made the documentation query, with the computing node then obtaining the requested documentation (or information associated with the requested documentation) from the computing nodes that have been prioritized on the list. Alternatively, the discovery server 20 can obtain the requested documentation (or information associated with the requested documentation) from the computing nodes on the search list based upon priority of the computing nodes and then forward such documentation/information to the node issuing the query.

During the searching process across the distributed network by different computing nodes, any node that does not contain certain documentation or information associated with the query for documentation may be allowed to obtain such documentation/information from any node to which it is connected (directly or indirectly) and which may have the requested documentation/information. The trust level assigned to two or more nodes may provide rules or procedures for allowing one computing node to share documentation/information with another computing node.

In addition, as noted above, the discovery server may be configured as the arbiter of the system network 2 that determines whether any node may establish a recognized connection with any other node. A decision regarding whether a recognized connection by the discovery server exists between nodes can be based upon any number of factors. Some non-limiting examples of factors used to determine whether the discovery server will recognize a connection between two or more nodes include, without limitation, node availability (e.g., one node location compared with another node location, uptime and latency statistics for a node, authorization or authentication credentials or requirements for a particular node (e.g., for gaining access to a node), trust level of one node in relation to another node, the load levels of a particular node (e.g., if a node has historically high load levels, the number of connections to this node may be limited, while a historically low load level for another node may indicate that this node is capable of accommodating additional connections with other nodes), and particular configurations that may be specific to a certain node and which may limit access to the node or access by the node to one or more other nodes.

In another example embodiment which is a modification to the system of FIG. 1, the system can be configured without a discovery server. Instead, some or all of the computing nodes 4 in the network 2 can include a discovery register that includes the different types of information about registered nodes, as well as information relating to recognized connections between nodes, priority or trust level information about nodes, etc. Computing nodes 4 having a sufficient trust level can perform the functions previously described in relation to the discovery server, such as being the arbiters for recognizing connections between nodes, prioritizing or establishing a trust level for nodes within a network, prioritizing and providing search results to a querying node, etc.

Thus, the embodiments of the present invention avoid potential issues associated with traditional models of sharing and searching documentation, such as the client/server model in which a centralized server provides the unified point of access for clients to search and view relevant documentation. By providing nodes that are capable of communicating, downloading, and providing information to and from other nodes in the distributed network, the potential for a single point of failure that typically exists with traditional systems is avoided. In addition, the distributed model utilized in the embodiments of the present invention facilitates the generation of a redundancy of information, thus ensuring that, if one node fails and contains a particular set of documentation, then other nodes with that set of documentation can still provide the requested resources based upon a query by a node within the network.

In addition, each computing node within the system network of the invention embodiments is not required to maintain a collection of all possible content that it may ever need. This minimizes the size and volume of content that a computing node must maintain. Each computing node has the ability to search and view content from adjacent and/or other connecting nodes in the network in order to retrieve data that it needs, when it needs it. Once the data has been searched, the client has the option to store the viewed content for use at a later time. Further, the computing node is ensured that the node or nodes from which content is being downloaded or obtained is reliable based upon the trust ranking of each node by the discovery server. The searching node that issues a query for documentation to the system network does not need to know the location, or even existence, of other nodes within the network. Documentation search results can be returned by the discovery server in such a way that the results of the most reliable or trustworthy nodes are ranked higher in relation to similar, but lower-ranked nodes, that may provide the same or similar content based upon the query. From the perspective of the computing node issuing the query, the search can appear to be performed locally even though it occurs through a distributed network.

It will be appreciated that the embodiments described above and illustrated in the drawings represent only a few of the many ways of implementing embodiments for searching documentation across interconnected nodes in a distributed network.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., browser software, communications software, server software, cleansing and data quality analysis software, etc.). These systems may include any types of monitors and input devices (e.g., keyboard, mouse, voice recognition, etc.) to enter and/or view information.

It is to be understood that the software (e.g., software utilized by the discovery server and any of the computing nodes) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information associated with requested documentation from a query. The database structures may be implemented by any number of any conventional or other databases, data stores or storage structures (e.g., files, databases, data structures, data or other repositories, etc.) to store information. The databases and/or other storage structures may be remote from or local to the computer or other processing systems, and may store any desired data.

Present invention embodiments may be utilized for analyzing the data of any types (e.g., boolean, character, alphanumeric, symbols, etc.) representing any information. Further, present invention embodiments may be utilized for analyzing data from any types of storage units, systems or devices (e.g., databases, files, memory devices, data structures, processing devices, various types of stationary or mobile computer or processing systems or devices, etc.). The data analyzed from one or more data sets may be of any size, and include any type of data and metadata.

The present invention embodiments may employ any number of any type of user interface (e.g., Graphical User Interface (GUI), command-line, prompt, etc.) for obtaining or providing information associated with a query (e.g., obtaining information for the desired analysis to be performed, providing charts or other data visualizations, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for analyzing and generating visualizations of data from any data source for any type of process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A computer-implemented method of retrieving documentation from a network including a plurality of computing nodes and a discovery register, the method comprising:
    registering each computing node within the network with the discovery register, wherein the discovery register establishes recognized connections between registered computing nodes to determine a priority for each computing node;
    processing a query by a querying node so as to obtain search results comprising documentation provided from one or more of the computing nodes within the network in accordance with the priority of each of the computing nodes, wherein the priority for each computing node is based on a trust level comprising a quantity of recognized connections between each computing node and other computing nodes within the network such that a first computing node having more recognized connections than a second computing node also has a higher trust level in relation to the second computing node; and arranging the search results in accordance with the priority of the corresponding one or more computing nodes providing the search results.

2. The method of claim 1, wherein the discovery register is provided within at least one of the computing nodes of the network.

3. The method of claim 1, wherein the discovery register is provided within a discovery server that communicates with each computing node within the network.

4. The method of claim 1, further comprising:
assigning one or more computing nodes to initially process the query based upon the priority determined for each computing node.

5. The method of claim 1, wherein at least two nodes share information relating to documentation of the query during processing of the query.

6. The method of claim 1, wherein the query is processed at a plurality of computing nodes, and search results are provided by the plurality of computing nodes.

7. The method of claim 1, wherein the trust level of each computing node is independent of any recognized connection between the computing node and the querying node.

8. The method of claim 1, wherein the priority of each computing node is further based on a relevance of information to be provided by each node in relation to the query.

9. A system for retrieving documentation from a distributed network, the system comprising:
a plurality of computing nodes, wherein each computing node is configured with logic to process a query by a querying node so as to obtain search results pertaining to the documentation; and
a discovery register configured to register each computing node within the network, wherein the discovery register is configured with logic to establish recognized connections between registered computing nodes to determine a priority for each computing node;
wherein the system is configured with logic to:
prioritize each of the computing nodes that has obtained search results pertaining to the documentation, wherein the priority for each computing node is based on a trust level comprising a quantity of recognized connections between each computing node and other computing nodes within the network such that a first computing node having more recognized connections than a second computing node also has a higher trust level in relation to the second computing node; and
arrange the search results in accordance with the priority of the corresponding one or more computing nodes providing the search results.

10. The system of claim 9, wherein the discovery register is provided within at least one of the computing nodes of the network.

11. The system of claim 9, further comprising a discovery server that includes the discovery register and that further communicates with each computing node within the network.

12. The system of claim 9, wherein the discovery register is further configured to assign one or more computing nodes to initially process the query based upon the priority determined for each computing node.

13. The method of claim 9, wherein at least two nodes are configured to share information relating to documentation of the query during processing of the query.

14. The system of claim 9, wherein the plurality of nodes provide the search results.

15. A computer program product for retrieving documentation from a network including a plurality of computing nodes, the computer program product comprising:
a computer readable storage memory having computer readable program code embodied therewith, the computer readable program code configured to:
register each computing node within the network within a discovery register, wherein the computer readable program code is further configured to establish recognized connections between registered computing nodes to determine a priority for each computing node;
process a query by a querying node so as to obtain search results comprising documentation provided from one or more of the computing nodes within the network in accordance with the priority of each of the computing nodes, wherein the priority for each computing node is based on a trust level comprising a recognized quantity of connections between each computing node and other computing nodes within the network such that a first computing node having more recognized connections than a second computing node also has a higher trust level in relation to the second computing node; and
arrange the search results in accordance with the priority of the corresponding one or more computing nodes providing the search results.

16. The computer program product of claim 15, wherein the computer readable program code is further configured to assign one or more computing nodes to initially process the query based upon the priority determined for each computing node.

17. The computer program product of claim 15, wherein the query is processed at a plurality of computing nodes, and search results are provided by the plurality of computing nodes.

* * * * *